US007793875B2

(12) United States Patent
Hurst

(10) Patent No.: US 7,793,875 B2
(45) Date of Patent: Sep. 14, 2010

(54) APPARATUS FOR DECOMPOSTING COMPRESSED TABLETS

(75) Inventor: Richard F. Hurst, Box 6400, Vero Beach, FL (US) 32961

(73) Assignee: Richard F. Hurst, Vero Beach, FL (US)

( * ) Notice: Subject to any disclaimer, the term of this patent is extended or adjusted under 35 U.S.C. 154(b) by 345 days.

(21) Appl. No.: 11/972,217

(22) Filed: Jan. 10, 2008

(65) Prior Publication Data

US 2009/0179095 A1 Jul. 16, 2009

(51) Int. Cl.
*A01D 34/90* (2006.01)
*A47J 42/00* (2006.01)

(52) U.S. Cl. .............................. 241/169.1; 241/DIG. 27

(58) Field of Classification Search ................. 241/168, 241/169.1, DIG. 27, 93
See application file for complete search history.

(56) References Cited

U.S. PATENT DOCUMENTS 2,001,075 A * 5/1935 Sundstrand ................ 241/88.4
2,524,335 A * 10/1950 Valenti ........................ 241/277
5,148,995 A 9/1992 Hurst
6,464,156 B1 * 10/2002 Wexell ........................ 241/93
6,915,973 B2 * 7/2005 So .......................... 241/169.1
7,337,997 B2 * 3/2008 Ko .............................. 241/93
2008/0116306 A1 * 5/2008 Ko .............................. 241/93

* cited by examiner

*Primary Examiner*—Bena Miller
(74) *Attorney, Agent, or Firm*—Monty Simmons; Simmons Patents

(57) ABSTRACT

The present invention relates to novel improvements to an apparatus for uniformly decomposing compressed tablets into a uniform size powder form. More particularly, the present invention is directed to improvements to the rotor cap of the apparatus allowing the rotor cap to be easily removed from the apparatus without the need for removal tools thereby allowing easy conversion from right hand operation to left hand operation and vice versa. Such improves also allow for disassembly and cleaning. Additional improvements including providing for a coding tab configured to represent predefined information such as ownership and previous use.

17 Claims, 8 Drawing Sheets

APPARATUS FOR DECOMPOSTING COMPRESSED TABLETS

TECHNICAL FIELD OF THE INVENTION

The present invention relates to novel improvements to an apparatus for uniformly decomposing compressed tablets into a uniform size powder form. More particularly, the present invention is directed to improvements to the rotor cap of such apparatus where such improvements allow the rotor cap to be easily removed from the apparatus to convert the apparatus from right hand operation to left hand operation and vice versa. Such improves also allow for disassembly and cleaning.

BACKGROUND OF THE INVENTION

The present invention relates to novel improvements of an apparatus for uniformly decomposing compressed tablets into a uniform size powder form.

The apparatus is configured to controllably crush and shave tablets in a compressed form using a minimum amount of manual force so as to deposit the decomposed tablet powder directly into a universal patient cup of the type standardized for use in hospitals. The improved rotor cap allows the apparatus to be quickly converted from left hand to right hand operation (and vice versa). In addition, such improves allow the apparatus to be disassembled more easily for cleaning and maintenance.

The present invention relates to an apparatus for solving a number of universally recognized problems. It has long been recognized that one of the preferred ways of administering medication is orally in tablet form. Medication in tablet form is the least expensive form in which to manufacture and package medication and is a preferred non-invasive delivery method. Further, compressed tablet form medication is the best form to avoid tampering.

There are several recognized problems associated with administering medication in tablet form. A principal known problem is that a large number of people are subject to gag reflex response which will not permit them to swallow a tablet in solid form. A large number of bedridden patients or patients disposed in a reclined position are also not capable of swallowing tablets in solid form or in granular form. Persons or patients having to use nasalgastrological feeding tubes or other types of feeding tubes require that their medication be presented in a solution or liquid form. Medication has heretofore been taken in liquid form through a straw or in a powdered form when mixed with food. The above problems that exist with human patients also exist in the field of veterinary medicine.

Heretofore, the preferred solution to the abovementioned problems of administering oral medication in tablet form is to grind, abrade (comminute) and compress fracture (crush). Heretofore, devices and apparatus for decomposing tablets in fractured particle form or in granular or in powder form have been classified in U.S. Class 241, Subclasses 168, 169 and 273 with comminution or defracture devices.

Typical of such crushing devices is shown in U.S. Pat. No. 2,892,595 which shows a pair of plastic nesting conical mortar and pestle assemblies. The problem with such crushing devices is similar to the well known pharmacists hard stone-like mortar and pestle which cannot generate the necessary forces to fracture and decompose ultra-hard tablets such as calcium gluconate, etc. Such crushing devices leave particles on both assemblies that are not easily dislodged when it is necessary to transfer the crushed tablet in a glass or receptacle for consumption.

Typical of such grating devices is shown in U.S. Pat. No. 2,804,896 which shows a household food grater or slicer having a hollow spool or cylinder provided with rows of sharp edge grating apertures formed therein. The article of food to be grated is placed in a hopper and a shaped follower is manually pressed down on the top of the food. This type grating device leaves a substantial amount of ungrated food in the hopper, apertures and the hollow spool, thus, cannot be used for comminuting medication in its present form or in a modified form without wasting a portion of the prescribed medication.

U.S. Pat. No. 4,209,136 shows a device for chopping and crushing medicinal tablets which device is adapted from a food chopper. This chopping device will reduce tablets to a granular form by a crushing or chopping action but leaves medication on the crusher foot and in the container when transfer is made to a glass or receptacle when used for consumption.

Referring now to the commonly owned U.S. Pat. No. 5,148,995 issued to Richard F. Hurst, such apparatus is configured for uniformly decomposing compressed tablets into a uniform size powder form. The U.S. Pat. No. 5,148,995 is hereby incorporated by this reference for all that it discloses. While such apparatus works well for its intended purposes, one drawback of the U.S. Pat. No. 5,148,995 device is that it can not be easily converted to from left hand operation to right hand operation (or vice versa) nor can be easily disassembled for cleaning.

What is needed is an improved apparatus configured for easy conversion from a first operation orientation to a second operation orientation as well as facilitating disassembly.

SUMMARY OF THE INVENTIONS

Some of the objects and advantages of the invention will now be set forth in the following description, while other objects and advantages of the invention may be obvious from the description, or may be learned through practice of the invention.

Broadly speaking, one principle object of the present invention is to provide an apparatus for decomposing compressed tablets into predetermined powder size and depositing the powder directly into a universal patient cup for direct use by a patient where the apparatus comprises enhanced features to allow operation orientation conversion.

It is another primary object of the present invention to provide a novel apparatus for decomposing compressed tablets into a powder form comprising an improved rotor cap configured to allow conversion of the apparatus from one operation orientation to a second operation orientation.

It is another primary object of the present invention to provide a novel apparatus for decomposing compressed tablets into a powder form comprising an improved rotor cap configured to allow conversion of the apparatus from a first operation orientation to a second operation orientation while also allowing for disassembly.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
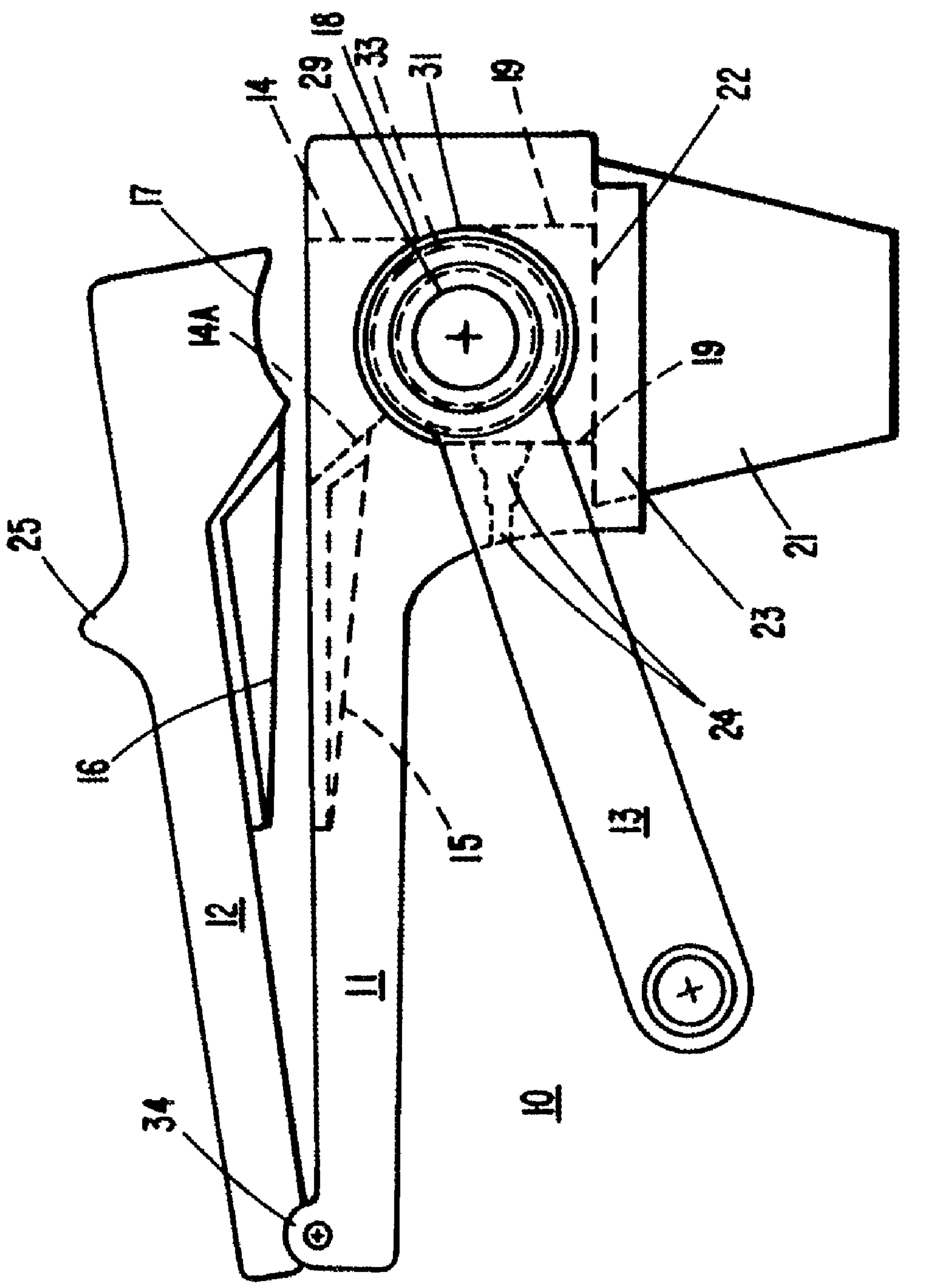
FIG. 1 is a side view in elevation of a preferred embodiment tablet decomposing apparatus according to the present invention.

Repeat use of reference characters throughout the present specification and appended drawings is intended to represent the same or analogous features or elements of the present technology.

DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

Refer now to FIG. 1 showing a side view in elevation of a preferred embodiment tablet decomposing apparatus (10) which comprises a housing assembly (11), a pressor foot assembly (12), and a rotor associated with a crank assembly (13) further associated with housing (11). The housing (11) is provided with a tapered feed hopper (14, 14A) in which tablets may be placed directly or pre-crushed (pre-fractured) by placing the tablet in the pre-fracturing recess (15) and crushing and fracturing the tablets placed in the pre-fracturing recess (15) by engaging them with the pre-fracturing blade (16) mounted on the pressor foot assembly (12). Blade (16) may be made from a piece of sharp metal or integrally molded as a blade as part of the assembly (12). The pressor foot (17) is provided with a partial cylindrical shape which is adapted to match and fit the tops of the slicing ribs (not shown) which rotate in the cylindrical plane (18). As will be explained in more detail hereinafter, tablets caught between the pressor foot (17) and the plane of revolution (18) of the slicing ribs will be sliced and pulverized while being held by the forward portion of the feed hopper (14). Discharge chute (19) is shown having the same width as the diameter of the cylindrical plane (18) of the slicing ribs and is larger than the opening of the tapered feed hopper (14) at its engagement point with the slicing rotor. A patient's cup (21) is shown held in place against the bottom surface (22) of the housing (11). The patient's cup (21) is a standard plastic cup having different types of calibrations or graduations thereon. Normally the cup is provided with graduations up to one fluid ounce, graduations up to eight drams, graduations up to two tablespoons, graduations up to 30 cubic centimeters and graduations up to 30 milliliters. Such cups are known as universal patients' cups and are used throughout the world. Since the cup (21) is standard and of uniform size throughout the world, it readily fits into an annular tapered ring provided as an extension on the housing assembly (11). It should be appreciated, however, that apparatus (10) may be used with non standard cups without departing from the scope and spirit of the present invention.

In the process of decomposing tablets, the size of the powder can be controlled by controlling the height of the slicing ribs as will be explained hereinafter. Since a very fine powder traps below the top of the slicing rib, a cleaning brush (not shown) may be inserted in the brush recess (24) and forms an effective means for dislodging powder. A thumb rest (25) is provided on pressor foot assembly (12) and is positioned there along to permit a person holding the decomposing apparatus (10) in one hand to apply sufficient pressure on the pre-fracturing blade (16) and pressor foot (17) to completely decompose tablets in the decomposing apparatus.

Figure 2:
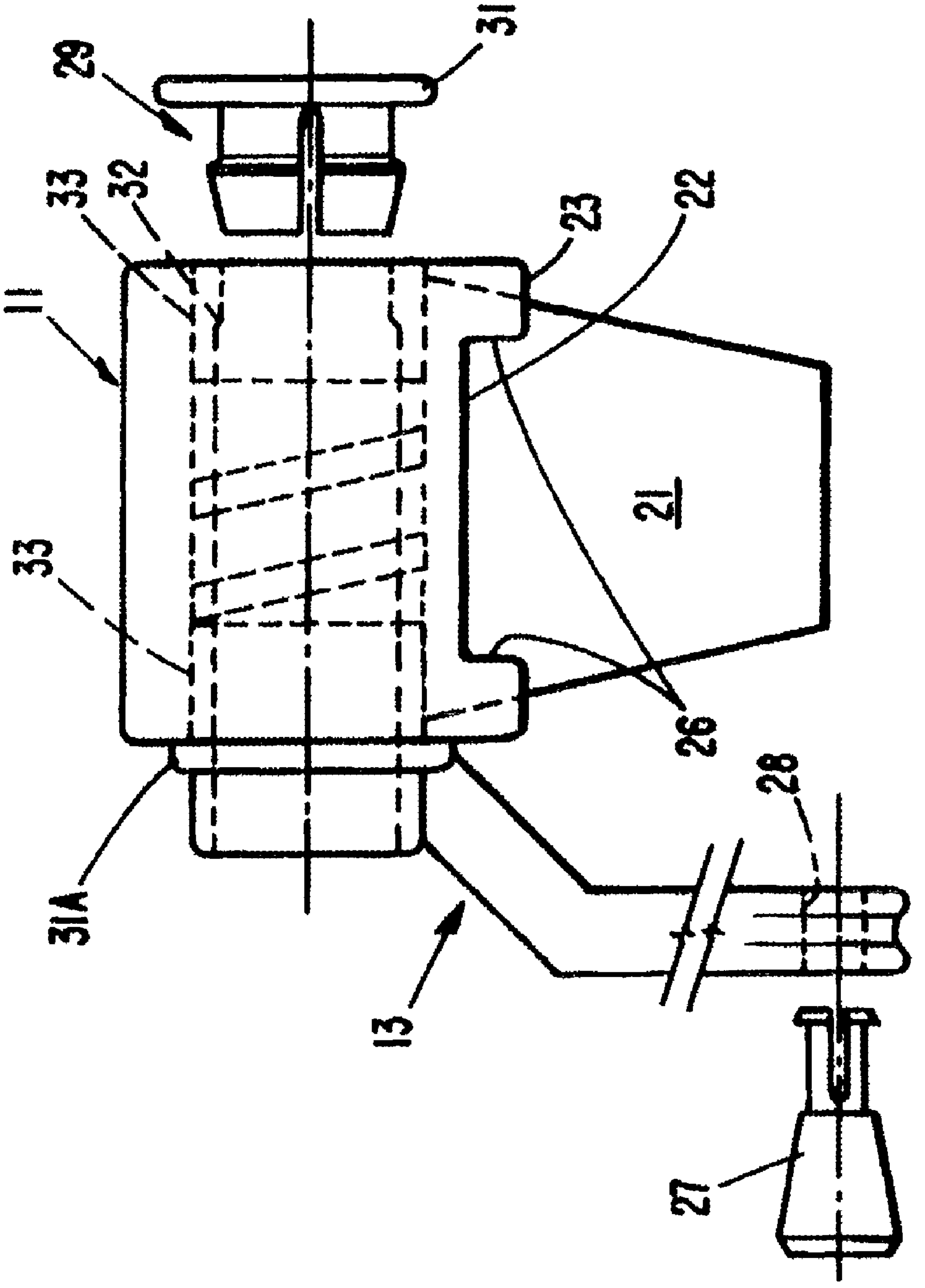
FIG. 2 is a front view of the apparatus shown in FIG. 1.

Refer now to FIG. 2 showing a front view of the apparatus (10) shown in FIG. 1. The patient's cup (21) is shown mounted in the annular tapered ring (23) which has an opening (26) which permits the top of the patient's cup (21) to be squeezed at the top and slid into place tightly against bottom surface (22). The flexing of cup (21) tightly holds the cup (21) against the surface (22) when released.

The rotor assembly (13) is shown comprising a crank having a rotatable knob (27) which snaps through recess (28)

during assembly. Housing (11) is provided with cylindrical bearing recesses (33) which are adapted to receive the bearings associated with the rotor in a manner which provides a seal and yet provides rotatable movement as will be explained hereinafter.

Similarly end cap (29) snaps into recess (32) as shown in FIG. 2. End cap (29) may comprise an anti-friction flange (31) and is preferably configured to urge the opposite anti-friction flange (31A) into engagement with the side of the housing (11).

Figure 9:
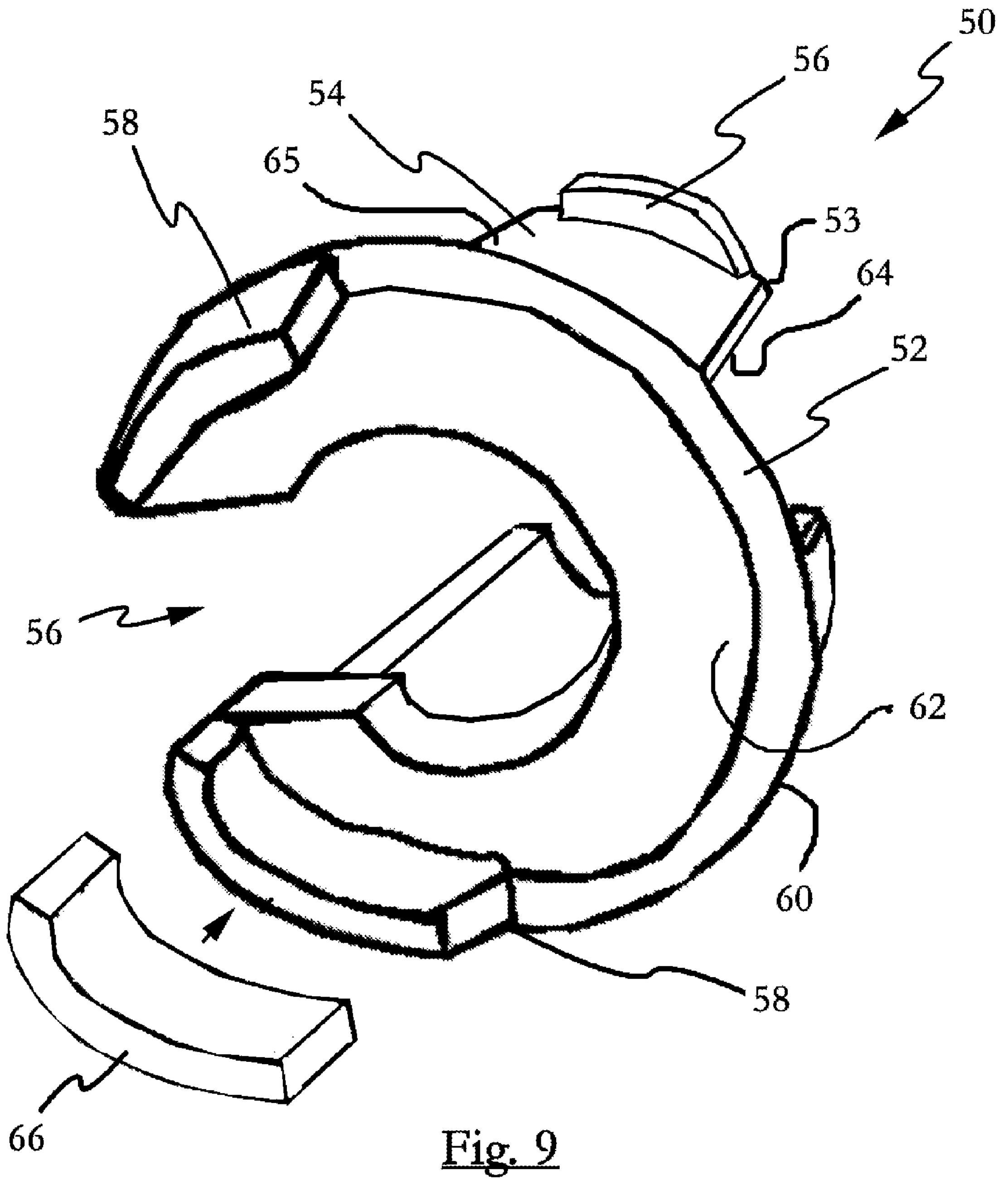
FIG. 9 is a side elevated view of one possible alternative embodiment of an end cap (50).

Referring now to FIG. 9, one alternative exemplary embodiment of the end cap (end cap (50)) is presented. End cap (50) comprises a discontinuous annular ring (52) associated with at least one depending section (54). For the presently preferred embodiment, there are two depending sections (54). Depending section (54) extends from side (60) of discontinuous annular ring (52) to a point distal from discontinuous annular ring (52) thereby defining distal end (53). For such embodiment, depending section (54) comprises a partially cylindrical surface defined by two opposing faces, outer face (65) and inter face (64). While the two depending sections are shown opposing each other it will be appreciated that other configurations may be used. Depending section (54) further comprises latching surface (56) configure to mechanically associate with rotor assembly (13). As depicted in FIG. 9, latching surface (56) defines a raised surface which is configured to reasably associate with rotor assembly (13).

End cap (50) further comprises two opposed pinching surfaces (58) configured to compress the discontinuous ring by at least partially closing gap (56) when a pinching force is applied to the opposed pinching surfaces (58). For the presently preferred embodiment, such pinching surfaces are finger grips. It will be appreciated that when a pinching force is applied to pinching surfaces (58), discontinuous ring (52) is compressed or deformed along gap (56) thereby causing the distal end (53) of the two depending sections (54) move in opposite directions so that latching surfaces (56) mechanically associate with rotor assembly (13) as described above. Restated, a pinching force applied to pinching surfaces (58) causing them to move closer together results in distal ends (53) moving apart. Conversely, when an object (such as a finger) is inserted between pinching surfaces (58) causing them to move apart, distal ends (53) move closer together thereby disassociating latching surface (56) from rotor assembly (13) allowing the end cap (56) to be removed. Such an end cap (50) configuration allows the end cap (50) to be disassociated from rotor assembly (13) thereby allowing rotor assembly (13) to be removed from apparatus (10) without the use of an end cap removal tool although a tool may be use if desired.

To identify a particular apparatus (10) device or apparatus (10) use, at least one pinching surface (58) may be configured to receive a coding tab (66). Coding tab (66) is simply a tab that may be used to distinguish one apparatus (10) from another. For example, coding tab (66) may be of a particular color or display a particular number. Such coding tabs are useful in performing several functions including: (a) distinguishing a first apparatus (10) owned by person A from a second apparatus (10) owned by person B, (b) distinguishing apparatus (10) blade configurations, (c) distinguishing an apparatus (10) that should only be use to process a particular type of pill or substance. As shown in FIG. 9, for the presently preferred embodiment, coding tab (66) is an insert that fits over pinching surfaces (58).

Figure 3:
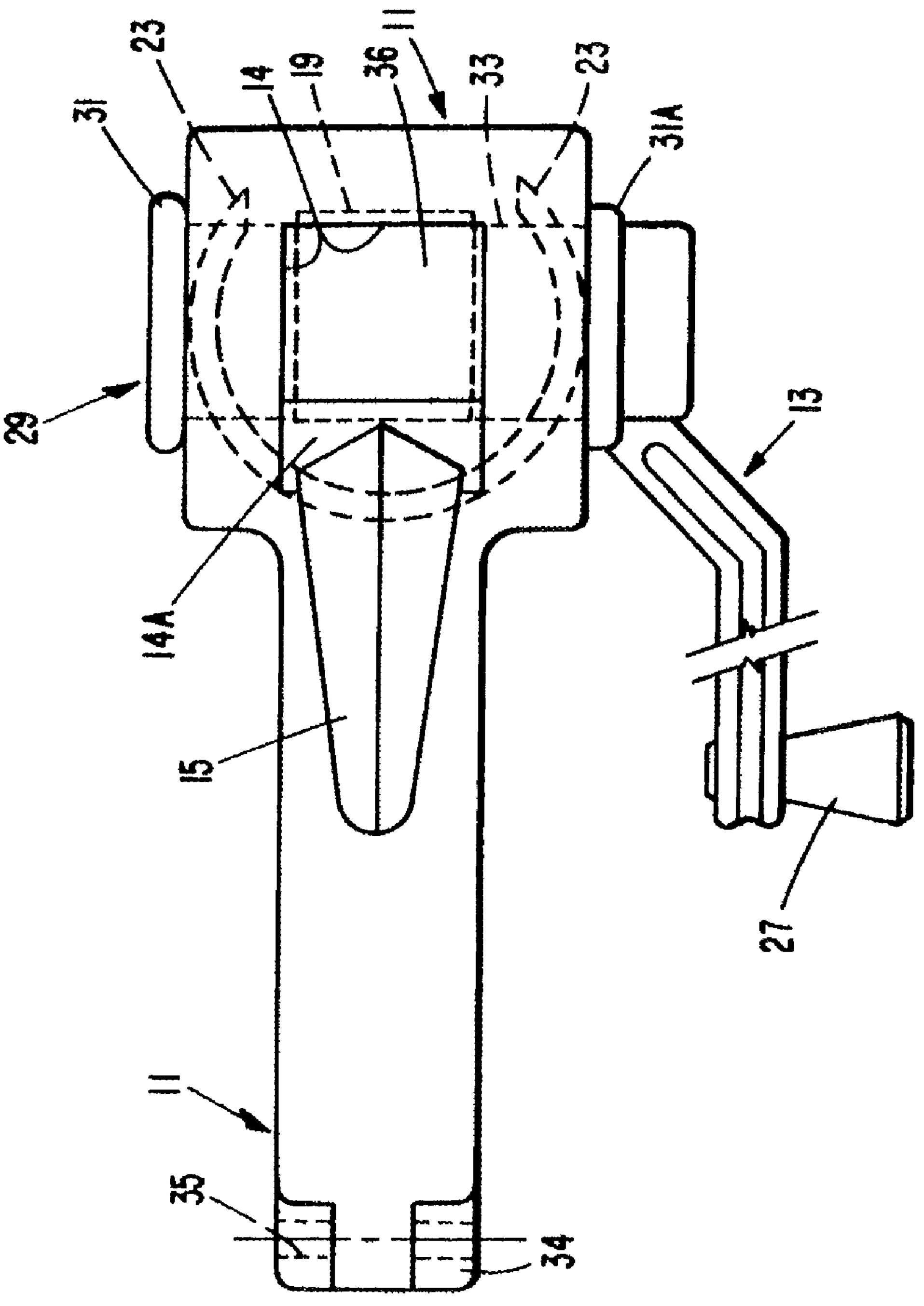
FIG. 3 is a partial top view showing the rotor and crank mounted in the housing of FIGS. 1 and 2 and showing a pre-fracturing recessed trough in the handle of the housing.

Refer back to FIG. 3 showing a top view of the housing assembly (11) with rotor assembly (13) mounted therein and the pressor foot assembly (12) removed. The pre-fracturing recess (15) is shown tapered and becoming progressively deeper as it approaches the tapered feed hopper (14) having a tapered side wall (14A). A hinge extension (34) is provided on the handle of the housing assembly (11) and adapted to receive a pin in the recess (35) to pivotally mount the pressor foot assembly (12) thereon. When using modern injection molded techniques, it is possible to eliminate the hinge extension (34) and substitute a flexible and narrow molded sheet of plastic for the hinge (34) and pin (35).

For one embodiment of the invention, the shaving means (36) preferably fills the hopper (14) and comprises raised ribs or other slicing/pulverizing means on an imperforate cylinder which preferably completely fills the hopper from wall to wall.

Figure 4:
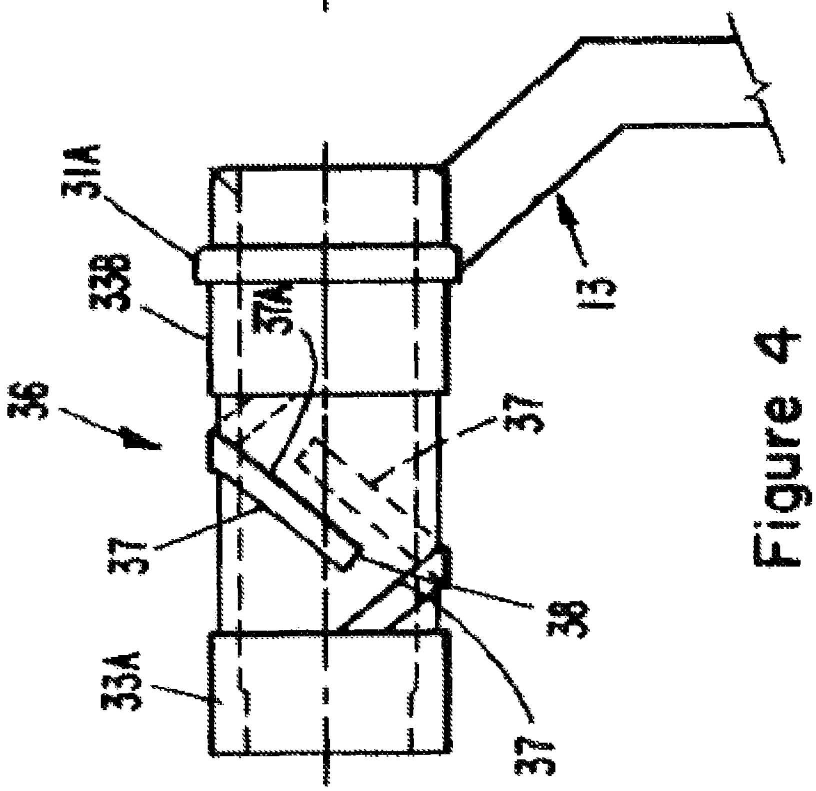
FIG. 4 is an enlarged view of a rotor showing dual anticlog slicing ribs according to the preferred embodiment of the present invention.

Refer now to FIG. 4 showing an enlarged view of the shaving means (36) on a rotor assembly (13). Cylindrical bearings (33A) and (33B) fit snugly but rotatably in the bearing recesses (33) shown in FIGS. 2 and 3. Shaving means (36) comprise a pair of raised ribs (37) that are discontinuous. The forward edges of ribs (37) are indicated at the lead line of the numerals (37) and are sharp protruding edges which cut or shave the bottom of a tablet which is placed in the tapered feed hopper (14). As will be explained hereinafter, the trailing edges (37A) may be tapered to minimize buildup of powder from the tablets. When the rotor is rotated clockwise in the direction of the arrow, the leading or cutting edge (37) will cause powder from the tablet to collect below the top of the rib and shift to the right to the end point (38). As the powder leaves the end point (38) of the rib (37), it soon engages the next leading edge (37) of the companion rib (37) and is then shifted to the right until it either slips by the end (38) or is deposited in the discharge chute (19). It will be understood that the rotor assembly (13) may be injection molded and is preferably made as a hollow cylindrical form in which the shaving means (36) is an imperforate part of the cylindrical. Thus any powder that is sliced from a tablet is shifted to the left and back to the right and to the left and back to the right until it is discharged in the discharge chute (19) as is clearly shown in FIGS. 1 through 3.

Figure 5:
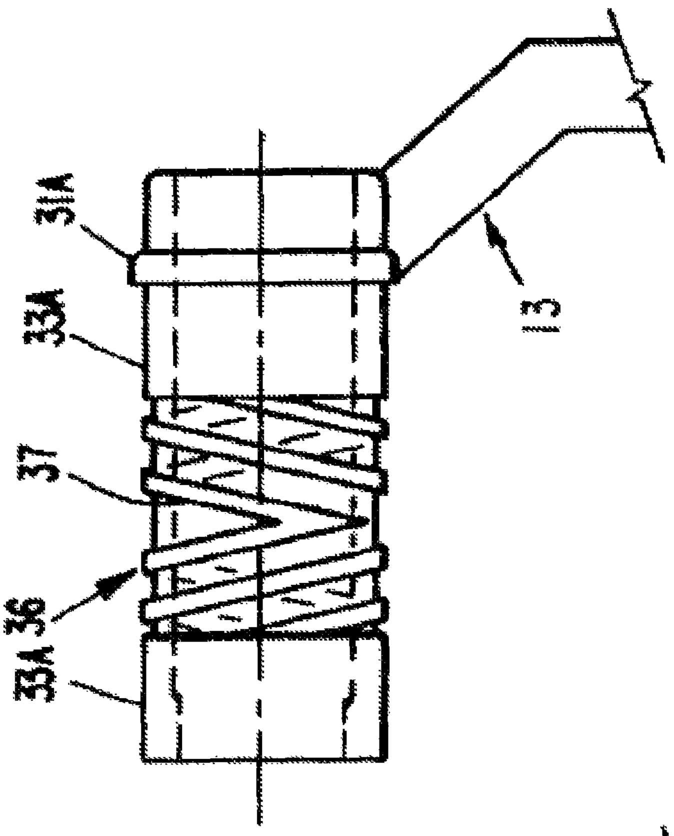
FIG. 5 is an enlarge view showing another rotor having dual cutting ribs which have a tendency to clog.

Refer now to FIG. 5 showing another form of dual rib shaving means. The leading edges of this dual spiral rib configuration tend to trap powder in the crotch of the V shown in the center of the shaving means (36). However, the nature of this device tends to move the powder shaved from the tablets towards the center of the discharge chute (19) and has been found to be an effective shaving means for most tablets. When used in conjunction with the cleaning brushes and combs to be described hereinafter, this dual rib configuration is extremely effective and when used in conjunction with tapered trailing edges of the ribs little or no residue is accumulated even without the cleaning brushes. Rotors made from hard glass-like finish plastic do not tend to clog.

Figure 6:
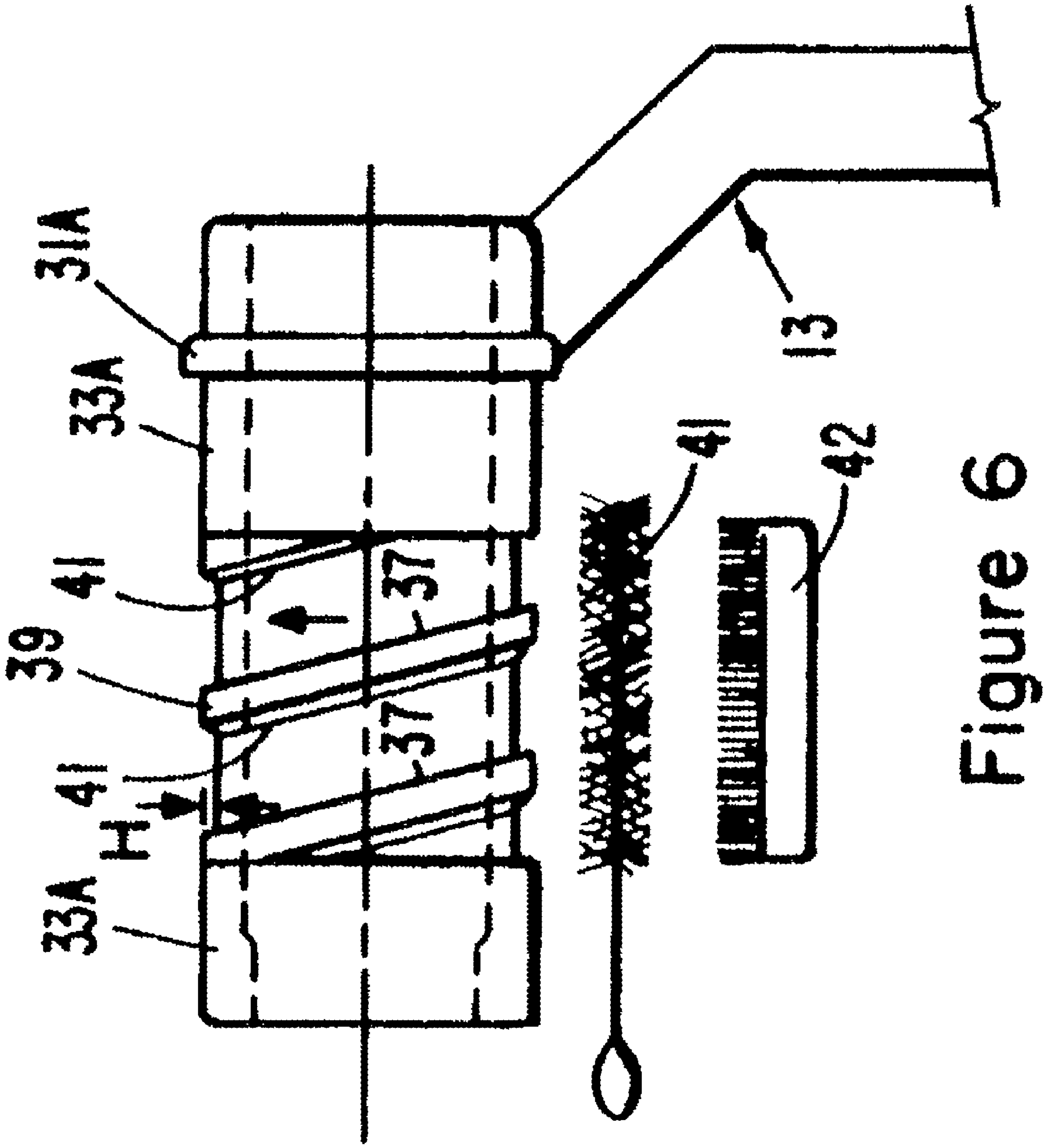
FIG. 6 is an enlarged view of a rotor having a continuous spiral cutting rib and a cleaning brush of the type which mounts in the housing juxtaposed the slicing ribs.

Refer now to FIG. 6 showing a singular helical rib (39) having leading cutting edges (37) and tapered trailing edges (41). While this single helical rib is extremely effective in slicing tablets by removing portions at no more than the height H of the rib (39), it tends to move the powder to the right and traps powder against the side of the rib (39) which engages the right most bearing (33A), however, deposits which form in this V shaped cavity can be easily removed by a resilient brush (41) which cleans the cavities below the tops of the ribs when properly inserted in the brush recess (24) shown in FIG. 1. It will be understood that the brush 41 may be replaced with a resilient comb (42) or resilient comb shaped brush (42) as the case may be.

Figure 7:
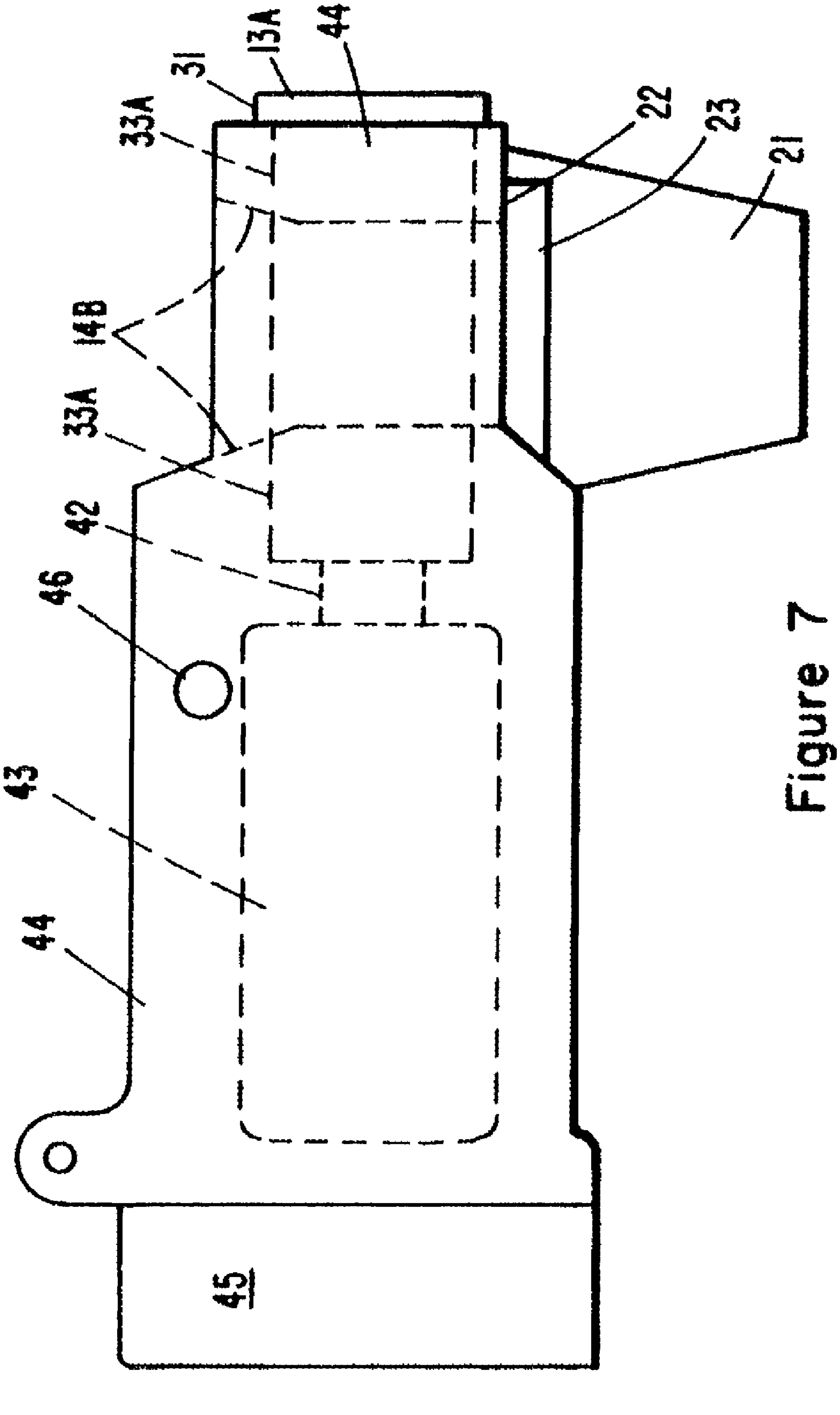
FIG. 7 is a front view and partial section of the motorized version of the apparatus shown in FIGS. 1 through 6.

Refer now to FIG. 7 showing a front view of a motorized version of the decomposing apparatus shown in FIGS. 1 to 6.

The major modification required for simplification or a motorized version is to change the axial direction of the shaving means (36) by 90 degrees so that the shaft (42) of the motor (43) in housing (44) can directly couple to the rotor means (13A, 36) thus replacing the need for a crank arm. The motor (43) is preferably driven by a rechargeable battery pack (45). In the preferred embodiment of the motorized version an actuation switch (46) is provided in the thumb area and completely clear of the pressor foot assembly (12A) (not shown). It will be appreciated that the rotor assembly (13A) may be provided with a cap having an anti-friction flange (31) which is adapted to hold the rotor assembly in place against the housing (44) and may be inserted in the housing assembly from the flange (31) end to engage a spline or recess in the shaft (42). The side walls (14B) of the hopper are shown having a taper, thus, the pressor foot (not shown) is provided with a similar taper and cylindrical shape so as to engage firmly against the slicing or cutting ribs of the rotor.

Figure 8:
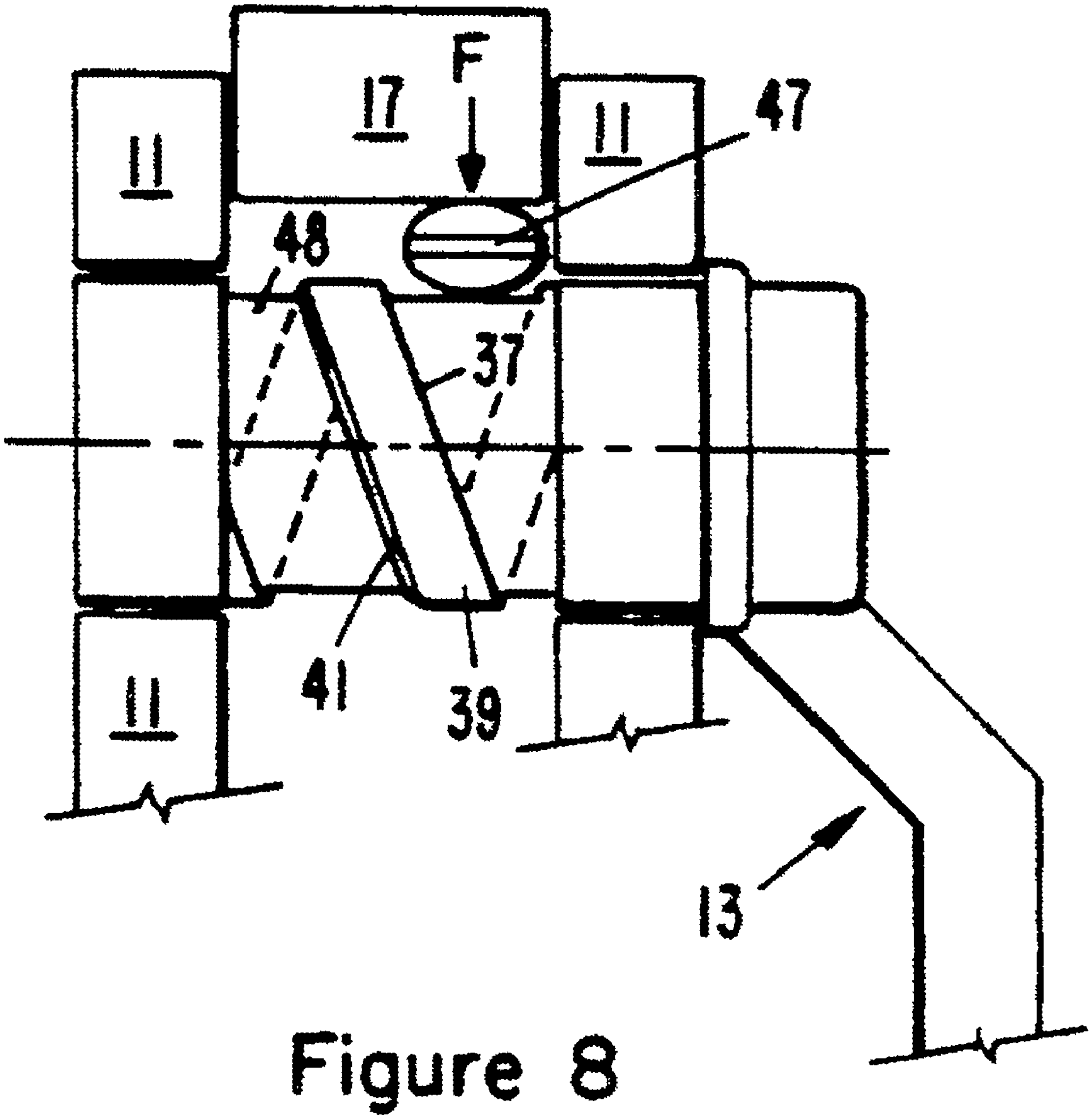
FIG. 8 is an enlarge schematic view of a continuous spiral slicing rib prior to slicing and cutting a tablet which is captured between the presser foot and one of the rotors of the apparatus from a crushing action.

Refer now to FIG. 8 showing an enlarge schematic view of a continuous spiral slicing rib (39) of a rotor assembly (13) mounted in a housing assembly (11) and having a curved pressor foot (17) engaging a tablet (47) between the pressor foot and the rotor surface (48). The force of the pressor foot (17) is seldom great enough to permit the leading edge (37) of the rib (39) to make a slice from the tablet (47) which is as thick as the height H of the rib (39). This is to say that the slicing action of the leading edge (37) actually shaves portions from the tablet (47) which never exceed the height H. The tablet (47) is urged by the inclined or helical direction of the rib (39) into engagement with a side of the housing (11) as shown. As portions of the tablet (47) are shaved or removed, the force of the pressor foot (17) will eventually cause the tablet to be crushed or fractured which further enhances the powdering and decomposition procedure even if the tablet has not been pre-fractured using the prefracturing means (15, 16) described hereinbefore. It will be appreciated that the diagonal or helical direction of the cutting edge (37) enhances the shaving action and reduces the force required to rotate the rotor, however, various forms of ribs have been considered. A horizontal rib or protrusion provided on the rotor (13) is not as effective as a helical shape. If the ribs are placed too close together then the tablet (47) does not have adequate space to drop between the helical ribs and perform the desirable shaving action. Other forms and shapes of ribs are operable but are not as effective as the helical shape described herein as the preferred embodiment of the present invention.

It will be appreciated that for the presently preferred embodiment, the universally standard patient's cup (21) fits so tightly against the bottom surface (22) that substantially no spillage will occur even when the apparatus is accidentally dropped after decomposing a tablet. In the preferred embodiment of the present invention it was found that the height H of the slicing rib (39) when made approximately 1/30th of an inch produced the best results.

A feature of the present invention is that it may be made for right handed persons or left handed persons by reversing the rotor assembly in the standard housing. Unlike prior art devices, improved apparatus (10) may be configured easily by a user by removing improved end cap (50). As described above, by applying a pinching force to opposed pinching surfaces (58), gap (56) is collapsed in some degree thereby disassociating latching surface (56) from rotor assembly (13) allowing end cap (50) to be removed from apparatus (10) without the use of removal tools. Once end cap (50) has been removed, rotor assembly () may be removed from a first side of apparatus (10) and inserted into a second side of apparatus (10). Once rotor assembly (13) has been reinserted into housing (11), end cap (50) is snapped into recess (32) thereby securing rotor assembly (13) at least partially within housing (11).

It should be appreciated that a blade (39) comprising a reverse helical shape may be used so that the leading edge cuts in the direction in which the left handed or right handed model would ordinarily be turned. Further, the motorized version shown in FIG. 7 has been made so that the rotor-shaving means is completely removable as a unit and may be cleaned and reused by standard cleaning and/or sterilization procedures.

While the novel decomposing apparatus was designed to reduce compressed tablets to a powder of a predetermined size it has been used to decompose peppercorns and coffee beans, thus, has a desirable secondary use for powdering hard and semi-hard condiments and food items. Powdered custom blend coffee may be deposited directly into a filter paper holder of the type used for a single cup of coffee made in a microwave oven or a larger filter of the type used in coffee machines. Thus, the preamble of the claims is not intended to restrict the claims to the preferred mode of use.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

what is claimed is:

1. An improved apparatus for decomposing compressed tablets comprising:

a housing defining a hopper therein, said hopper suitably configured for receiving tablets, said housing further defining a discharge chute for receiving processed tablets;

a cylindrical aperture extending through said housing and positioned between said hopper and said discharge chute;

a rotor suitably sized to fit within said cylindrical aperture, said rotor comprising a rotor-first-end and a rotor-second-end and wherein said rotor-first-end is associated with a crank and wherein said rotor is positioned within said cylindrical aperture so that said rotor-first-end is positioned at a first side of said cylindrical aperture and said rotor-second-end is positioned at a second side of said cylindrical aperture;

a blade positioned between said rotor-first-end and rotor-second-end, said blade protruding from said rotor a predefined distance;

a pressor foot associated with said housing, said pressor foot configured for pressing tablets into said hopper;

an end cap defining a latching surfacing configured for releasably associating with said rotor-second-end, said end cap further defining an annular discontinuous ring associated with at least one partially cylindrical surface that extends perpendicularly from said ring to a distal end and wherein said rotor-second-end is configured to receive said latching surface associated with said end cap thereby securing said rotor at least partially within said cylindrical aperture; and wherein said end cap is appropriately configured to allow the end cap to be disassociated from said rotor without the need for end cap removal tools thereby allowing the rotor to be disassociated from said apparatus without the need for removal tools.

2. An improved apparatus for decomposing compressed tablets as in claim 1, wherein the latching surface is associated with said perpendicularly extending surface.

3. An improved apparatus for decomposing compressed tablets as in claim 2, wherein said latching surface extends substantially perpendicularly from the outside of said perpendicularly extending surface a predefine point distal from said perpendicularly extending surface.

4. An improved apparatus for decomposing compressed tablets as in claim 2, wherein the latching surface comprises a raised surface positioned at the distal end of said perpendicularly extending surface.

5. An improved apparatus for decomposing compressed tablets as in claim 4, further comprising opposing raised finger grips associated with said annular discontinuous ring, said opposing raised finger grips extending outwardly from said discontinuous ring and configured so that inserting an object between said opposing raised finger grips moves said opposing raised finger grips apart causing said raised surface to disassociate from said rotor-second-end thereby allowing spread-and-pull removal of said end cap.

6. An improved apparatus for decomposing compressed tablets as in claim 5, wherein at least one raised finger grip is configured to receive a coding tab.

7. A method of removably associating a rotor assembly with a housing of an apparatus for decomposing compressed tablets comprising the steps of:

providing a housing comprising a cylindrical aperture disposed between a hopper and a discharge chute;

providing a rotor disposed within said cylindrical aperture;

providing an end cap defining an annular discontinuous ring associated with at least one partially cylindrical surface that extends perpendicularly from said ring to a distal end and further defining a latching surface wherein said rotor is configured to releasably receive said latching surface thereby releasably associating said rotor with said housing; and wherein said end cap is appropriately configured to allow said end cap to be disassociated from said rotor without the need for end cap removal tools.

8. A method of removably associating a rotor assembly with a housing as in claim 7, further comprising the step of associating at least one said latching surface with said perpendicularly extending surface wherein said latching surface is received by said rotor thereby securing said rotor within said cylindrical aperture.

9. A method of removably associating a rotor assembly with a housing as in claim 8, wherein said at least one latching surface comprises a raised surface positioned at the distal end of said perpendicularly extending surface.

10. A method of removably associating a rotor assembly with a housing as in claim 9, further comprising the steps of associating opposing raised finger grips with said annular discontinuous ring.

11. A configurable hand held apparatus for decomposing compressed tablets comprising:

a housing defining a hopper therein, said hopper suitably configured for receiving tablets, said housing further defining a discharge chute for receiving processed tablets;

a cylindrical aperture extending through said housing thereby defining a first aperture side and opposing second aperture side, said cylindrical aperture positioned between said hopper and said discharge chute;

a rotor suitably sized to fit within said cylindrical aperture, said rotor comprising a rotor-first-end and a rotor-second-end and wherein said rotor-first-end is associated with a crank and wherein said rotor is positioned within said cylindrical aperture so that said rotor-first-end is mechanically associated with said first aperture side and said rotor-second-end is mechanically associated with said second aperture side;

a blade associated with said rotor and positioned between said rotor-first-end and rotor-second-end, said blade protruding from said rotor a predefined distance;

an end cap defining a discontinuous annular ring associated with at least one partially cylindrical surface that extends perpendicularly from said ring to a distal end, said end cap configured to extend into at least one of said first aperture side and said second aperture side and releasably associate with said rotor-second-end when said rotor is positioned within said cylindrical aperture and wherein said rotor-second-end is configured to receive a latching surface associated with said end cap thereby releasably associating said rotor with said housing; and wherein said end cap is appropriately configured to allow the end cap to be disassociated from said rotor rotor-second-end without the use of a removal tool.

12. A configurable hand held apparatus for decomposing compressed tablets as in claim 11, wherein said latching surface extends perpendicularly from the distal end of said partially cylindrical surface.

13. A configurable hand held apparatus for decomposing compressed tablets as in claim 11, wherein said discontinuous annular ring further comprises opposing raised finger grips associated with said annular discontinuous ring, said opposing raised finger grips extending outwardly from said discontinuous ring and configured so that asserting a spreading force to said finger grips causes said finger grips move away from each other thereby causing said latching surface to disassociate from said rotor-second-end.

14. A configurable hand held apparatus for decomposing compressed tablets as in claim 13, wherein at least one of said raised finger grips is further configured to perform a coding function.

15. A configurable hand held apparatus for decomposing compressed tablets as in claim 13, wherein at least one raised finger grip is configured to receive a coding tab.

16. A configurable hand held apparatus for decomposing compressed tablets as in claim 15, wherein said coding tab is configured to identify at least one of (a) ownership criteria and (b) apparatus use criteria.

17. A configurable hand held apparatus for decomposing compressed tablets as in claim 15, wherein said coding tab is configured to identify the configuration of said blade.

* * * * *